United States Patent [19]

Hung

[11] Patent Number: 5,584,706
[45] Date of Patent: Dec. 17, 1996

[54] IC CARD CONNECTOR HAVING TWO GROUNDING CONTACTS

[75] Inventor: C. Y. Hung, Chung-Ho, Taiwan

[73] Assignee: Acer Incorporated, Taipei, Taiwan

[21] Appl. No.: 364,214

[22] Filed: Dec. 27, 1994

[51] Int. Cl.$^6$ .................................................. H01R 9/09
[52] U.S. Cl. ............................................. 439/64; 361/799
[58] Field of Search .............................. 439/108, 326, 439/260, 72, 74, 95, 64; 361/737, 760, 799

[56] References Cited

U.S. PATENT DOCUMENTS 4,820,186  4/1989  Fujii ............................ 439/326
5,000,694  3/1991  Komatsu ........................ 439/260
5,226,826  7/1993  Nillson et al. .................. 439/72

*Primary Examiner*—Neil Abrams
*Assistant Examiner*—Eugene G. Byrd
*Attorney, Agent, or Firm*—Townsend and Townsend and Crew LLP

[57] ABSTRACT

An IC card connector having two grounding contacts is disclosed. The IC card connector comprises a connector body for connecting onto a mainboard, a carrier for accommodating IC cards, and grounding means for grounding the two grounding contacts of the IC card to the wiring on the mainboard without hindering assembling and disassembling of said carrier.

15 Claims, 4 Drawing Sheets

IC CARD CONNECTOR HAVING TWO GROUNDING CONTACTS

BACKGROUND OF THE INVENTION

The present invention relates to card connectors, and in particular, to those connectors for holding IC cards having grounding contacts on sides.

The development trend for personal computers has been for more compact and mobile versions. While computers are getting smaller in size, various evolutionary technologies have enhanced their capabilities and functions. For example, a notebook computer incorporating an IC card (e.g., a PCMCIA card) bearing the function of a modem is capable of sending electronic data through telephone lines. A conventional modem IC card has two grounding contacts, one on each side. When such a modem card is inserted into the carrier, it produces electromagnetic noise which exceeds most EMI requirements.

As can be seen, there is a need for reducing the electromagnetic noise caused by the insertion of IC cards to meet EMI requirements.

SUMMARY OF THE INVENTION

The purpose of the present invention is therefore to provide an IC card connector which grounds the inserted IC card effectively, thereby decreasing the EMI level without hindering the assembling and disassembling of the connector to and from the mainboard.

The IC card connector according to the present invention comprises a connector body for connecting onto a mainboard and a carrier body for accommodating the IC card. The two grounding contacts on the IC card can be electrically conducted through the carrier to the wiring on the mainboard to achieve grounding. The invention further comprises grounding means for effectively performing such grounding without causing inconvenience in assembling and disassembling of the carrier.

The carrier comprises two grounding devices for contacting with the two grounding contacts of the IC card. The carrier also comprises a pair of bosses for installing in a pair of through holes on the mainboard. In this event, the grounding means comprises a pair of grounding pieces for electrically connecting to the wiring on the mainboard, the grounding pieces each comprise a first end electrically connected to one of the bosses and a second end electrically connected to one of the grounding devices.

The first end may further comprise a hold for accepting one of the bosses. The first end may further comprise an upright portion, preferably curvy, for fittingly surrounding and stabilizing the boss.

The second end may further comprise an opening for electrically connecting one of the grounding devices. The opening is preferably rectangular, and can be soldered to the grounding device.

The mainboard may further comprise two grounding pads, each electrically connected to one of the first ends, for a better EMI grounding effect.

DETAILED DESCRIPTION OF THE PREFERRED EMBODIMENT

Figure 1:
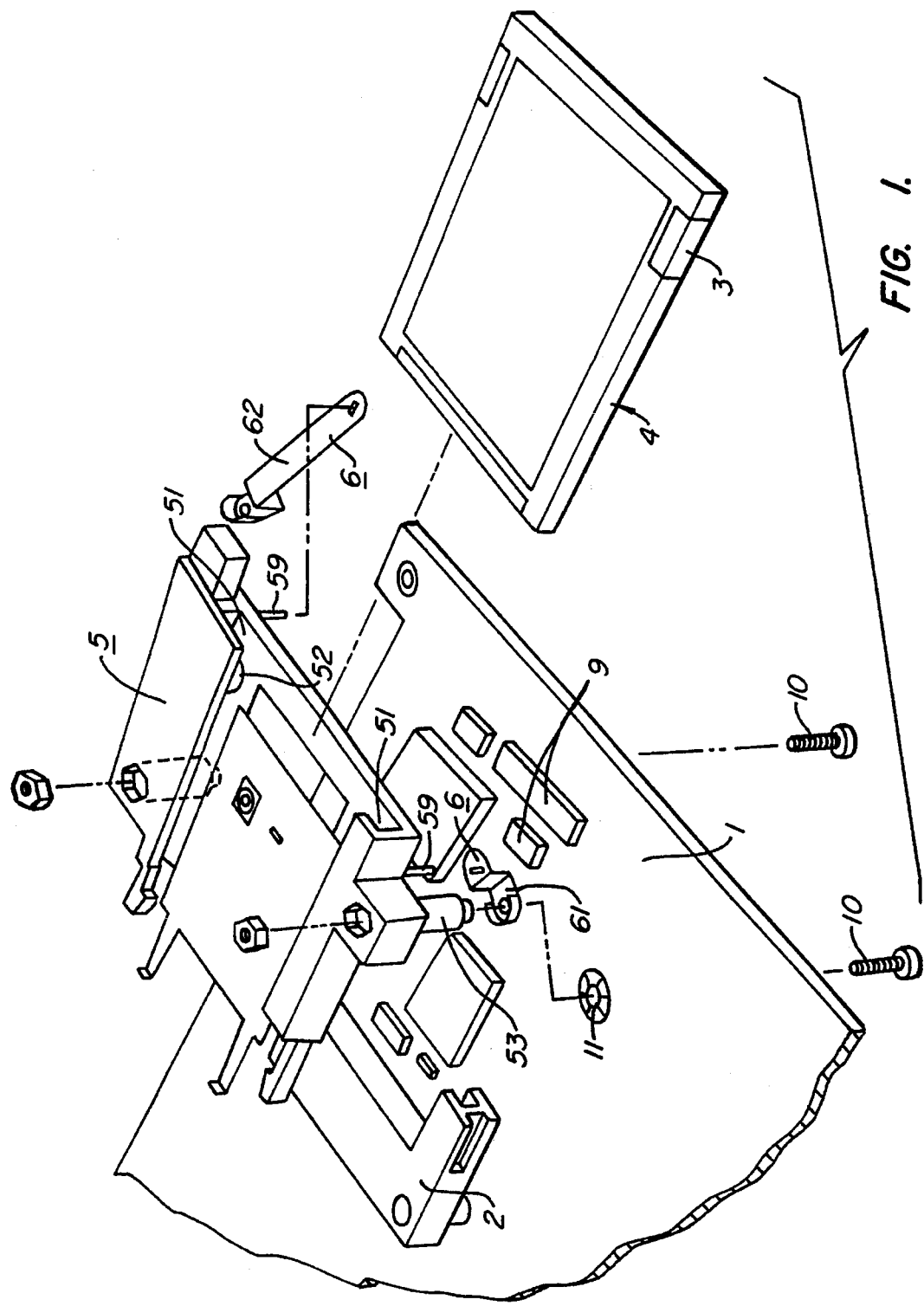
FIG. 1 shows an explosive view of one embodiment of the invention.

FIG. 1 illustrates one embodiment of a connector for grounding IC cards. As shown, the connector assembly includes a connector body 2 and a carrier 5 for mounting onto a mainboard 1. The connector body employs bosses 13 to elevate it above the components, such as memory modules 9, located on the mainboard. Carrier 5 also employs bosses 53 which are inserted into mounting holes 11 located on the mainboard. Each boss may be recessed on the end to create a ledge so as to maintain the carrier in a fixed position relative to the mainboard. Additionally, extensions 70 on carrier 5 are fitted to slots 71 on the connector body to ensure proper alignment between the pieces of the connector.

Carrier 5 includes recesses 51 for guiding an IC card 4 which is to be inserted into the connector body. The IC card has grounding contacts 3 located on its edges 4. Recesses 51 of the carrier contain grounding devices 52. Generally, the number of grounding devices 52 equals the number of grounding contacts 3. As shown, IC card 4 has two grounding contacts that are to be grounded through wiring on mainboard 1. The grounding devices are situated such that they contact the grounding contacts 3 on IC card 4 when it is inserted into the connector.

To create a connection between the grounding devices and the wiring on the mainboard, grounding pieces 61 and 62 are employed. This connection is established by connecting one end of grounding piece 61 to a portion 59 of grounding device 52 and the other end to boss 53. In one embodiment, portion 59 protrudes beneath carrier 5. Optionally, grounding pads may be located at hole 11 to improve contact between grounding piece 61 and the wiring on the mainboard 1. In a similar manner, grounding piece 62 is connected to the grounding device and wiring on the mainboard. Grounding pieces 61 and 62, although similar in design, may have different lengths due to distance variations between the connection points for each grounding device.

According to some embodiments, carrier 5 is secured on the mainboard by screws 10. By loosening screws 10, the carrier can easily be removed from the mainboard for convenient maintenance of the components 9 located on the mainboard beneath the carrier.

Figure 2:
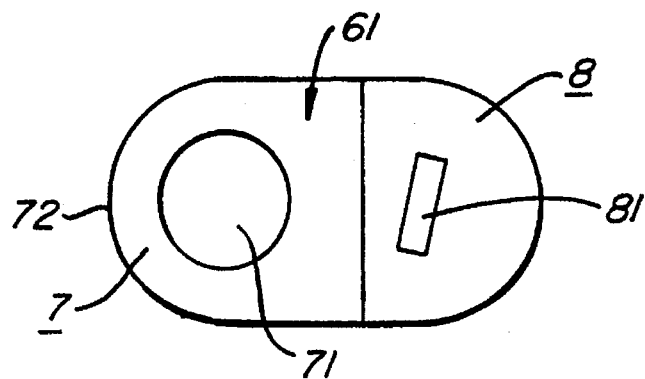
FIG. 2 shows a top view of one of the grounding pieces in the grounding means of FIG. 1.
Figure 3:
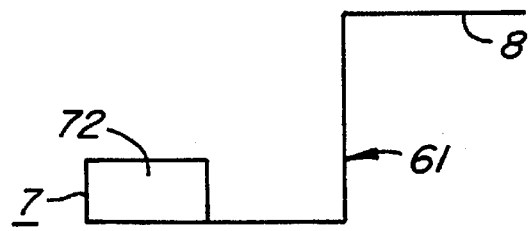
FIG. 3 shows a side view of the grounding piece of FIG. 2.
Figure 4:
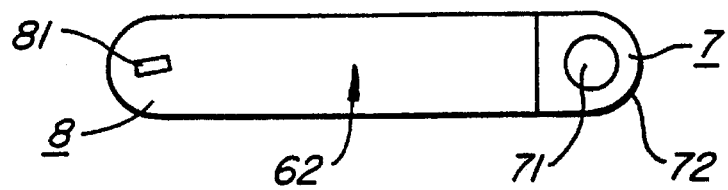
FIG. 4 shows a top view of the other grounding piece in the grounding means of FIG. 1.
Figure 5:
FIG. 5 shows a side view of the grounding piece of FIG. 4.

FIGS. 2–5 illustrate grounding pieces 61 and 62 in greater detail. Specifically, FIGS. 2 and 3 show the top and side view of grounding piece 61 and FIGS. 4–5 show the top and side view of grounding piece 62. As previously discussed, the grounding pieces 61 and 62 may have different lengths. As shown, the grounding pieces each includes a first end 7 and a second end 8. A hole 71, through which a boss is inserted, is located at first end 7. Optionally, a curvy upright portion 72 may be formed to fit around the boss. At second end 8, an opening 81 is provided to accommodate the grounding contact. The grounding contact may be soldered to opening 81 in order to ensure a good electrical connection. In one embodiment, opening 81 may be specifically shaped (i.e., rectangle) to match the portion of the grounding device that is inserted through the opening. Thus, first end 7 is electrically connected to the boss and the second end 8 is electrically connected to the grounding device so as to create an effective grounding means to reduce excessive EMI noise.

Figure 6:
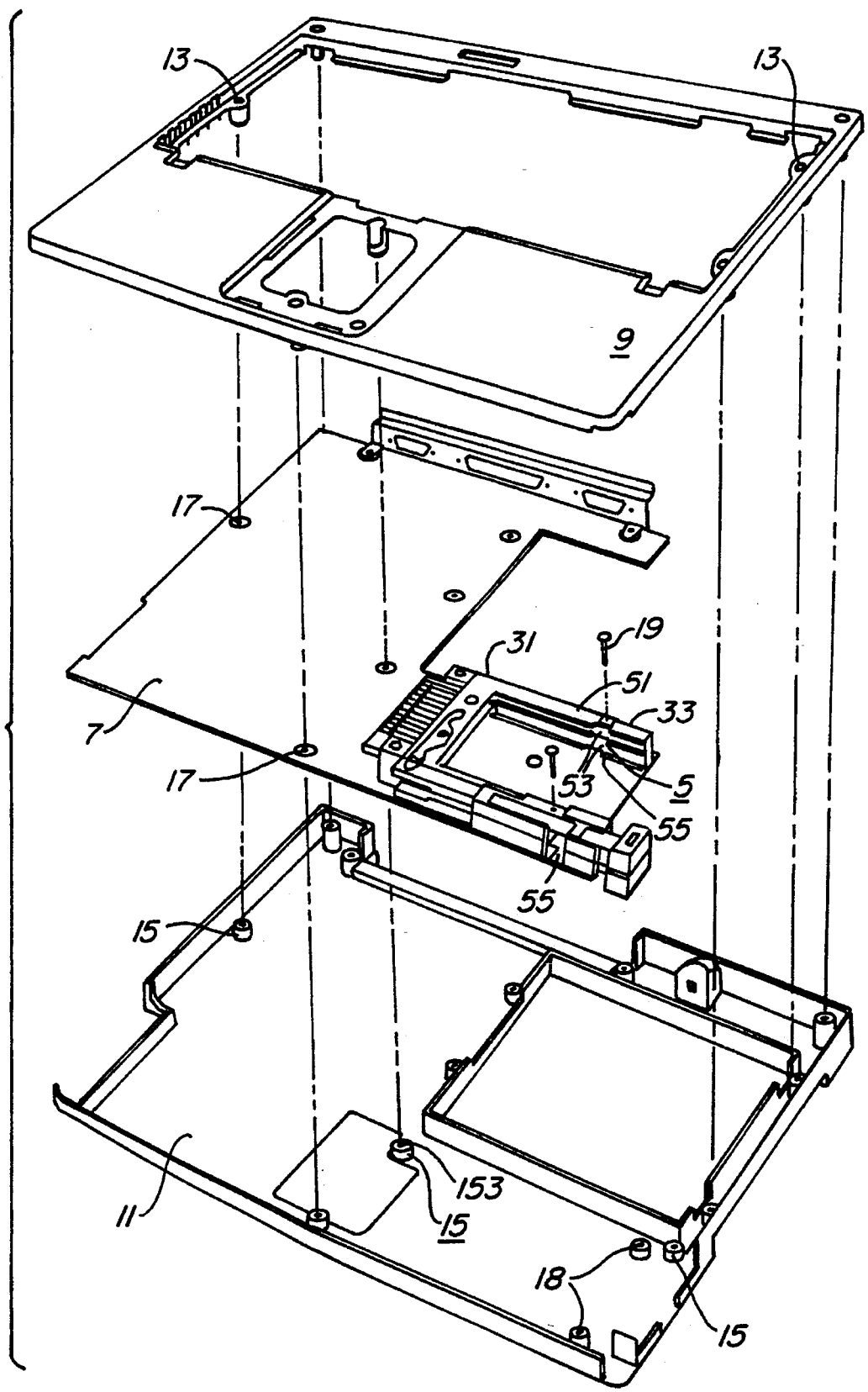
FIG. 6 shows an alternative embodiment of the invention.

Referring to FIG. 6, an alternative embodiment of the invention employed in a computer system is illustrated. The computer system includes a mainboard 7 encased by a bottom housing 11 and a top housing 9. Mainboard 7 is mounted with a connector assembly 1 for holding an IC card. The connector assembly includes a connector body 31 and a carrier 33. The carrier is provided with recesses 53 to guide the IC card into the connector body. As shown, the carrier includes two sets of recesses to accommodate two IC cards. Recesses 53 of the carrier comprises grounding devices 5. In some embodiments, screws are inserted through holes 55 and into receptacles 18 on bottom housing 11 to attach the grounding devices to the carrier. The grounding devices are situated such that they contact the grounding contacts on the IC cards when they are inserted into the connector.

The bottom housing is provided with raised sections 15 having holes 153 to support mainboard 7. Holes 153 are aligned with holes 17 on the mainboard and receptacles 13 on the top housing. Fasteners, such as screws or bolts, are inserted through holes 153, holes 17, and into receptacles 13 for assembling the computer system.

Figure 7:
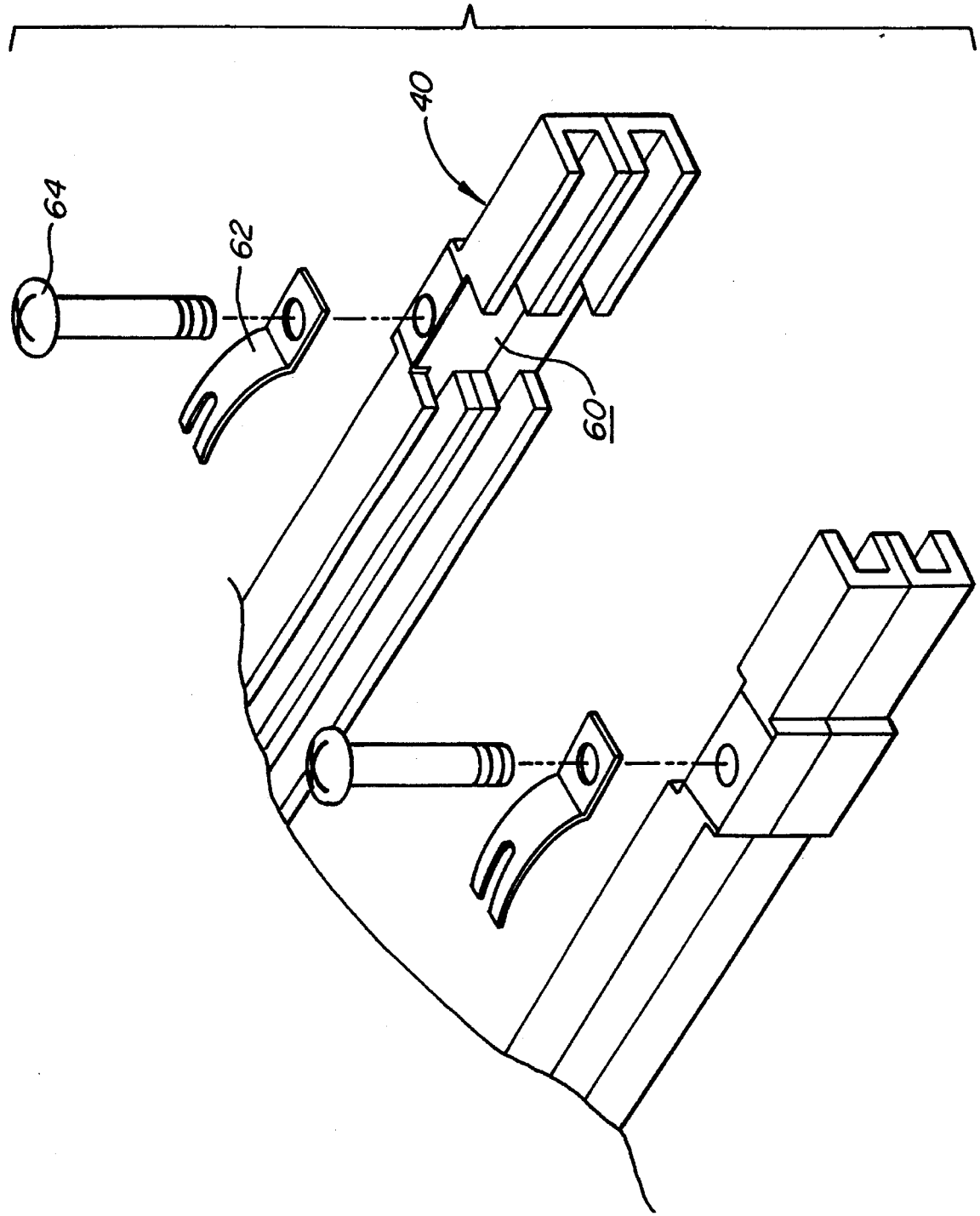
FIG. 7 shows a detail view of the grounding means of FIG. 6.

FIG. 7 illustrates the grounding devices in greater detail. As shown, the carrier has a plurality of recess members 40 for holding IC cards. The carrier may contain cut portions for locating grounding contacts 60. Each grounding contact wraps around the top, cut portion, and the bottom of the carrier. An adhesive may be used to attach the grounding contacts to the carrier.

Grounding pieces 62 having a first end and a second end are coupled to the carrier at the cut portions 65. The first end comprises a flat portion having a hole and the second end comprises a curved portion. Each grounding piece is coupled to the carrier by inserting a screw 64 through the hole in the first end and the hole on the carrier. As previously discussed, the screw is attached to a receptacle located on the bottom housing. Once attached, the second end of the grounding pieces are elevated from the top surface of the carrier. When the computer system is assembled, the top housing presses down on the grounding pieces 62, thereby grounding the IC card. Thus, the grounding devices effectively ground the IC cards to reduce excessive EMI noise.

The scope of protection intended in this invention is set forth in the following claims. Any equivalent modification by persons skilled in the art, for example, omitting the grounding devices 52 and placing the second end 8 directly in the recess 51 for electrically contacting with grounding contacts on the IC card, is deemed to be covered by the claims.

What is claimed is:

1. An IC card connector having two grounding contacts, comprising:
    a body for coupling onto a mainboard;
    a carrier for accommodating an IC card, said IC card including two grounding contacts, said carrier having two grounding devices for electrically contacting said two grounding contacts on the IC card and achieving grounding effect through wiring on the mainboard, said carrier further having a pair of bosses for securing said carrier through a pair of holes on the mainboard; and
    grounding means having a pair of grounding pieces for electrically contacting with the wiring on the mainboard, each of the grounding pieces having a first end electrically coupled to one of the bosses and a second end electrically coupled to one of the grounding devices, thereby causing the two grounding contacts on the IC card to be effectively grounded without hindering assembling and disassembling of said carrier.

2. The IC card connector of claim 1, wherein the IC card is a modem card.

3. The IC card connector of claim 1, wherein the first end includes a hole for insertion of one of the bosses.

4. The IC card connector of claim 1, wherein the first end includes an upright portion for fittingly surrounding one of the bosses.

5. The IC card connector of claim 1, wherein the mainboard includes a grounding pad electrically connecting to the first end.

6. The IC card connector of claim 1, wherein the second end includes an opening for insertion of the grounding device.

7. The IC card connector of claim 6, wherein the opening is rectangular.

8. The IC card connector of claim 6, wherein the grounding devices is soldered to the second end.

9. An IC card connector comprising:
    a carrier for receiving an IC card, said IC card including two grounding contacts, said carrier having two grounding devices for connecting said two grounding contacts on the IC card and providing a grounding effect through wiring on a mainboard, said carrier also having a pair of bosses for securing said carrier through a pair of holes on the mainboard; and
    grounding means having a pair of grounding pieces for electrically contacting with the wiring on the mainboard, each of the grounding pieces having a first end electrically coupled to one of the bosses and a second end electrically coupled to one of the grounding devices, thereby causing the two grounding contacts on the IC card to be grounded.

10. The IC card connector of claim 9 wherein the IC card is a modem card.

11. The IC card connector of claim 9 wherein the first end includes a hole for insertion of one of the bosses.

12. The IC card connector of claim 9 wherein the first end includes an upright portion for fittingly surrounding one of the bosses.

13. The IC card connector of claim 9 wherein the mainboard includes a grounding pad electrically connecting to the first end.

14. The IC card connector of claim 9 wherein the second end includes an opening for insertion of the grounding device.

15. The IC card connector of claim 9 wherein one of the grounding devices is soldered to the second end.

* * * * *